United States Patent Office 3,093,347
Patented June 11, 1963

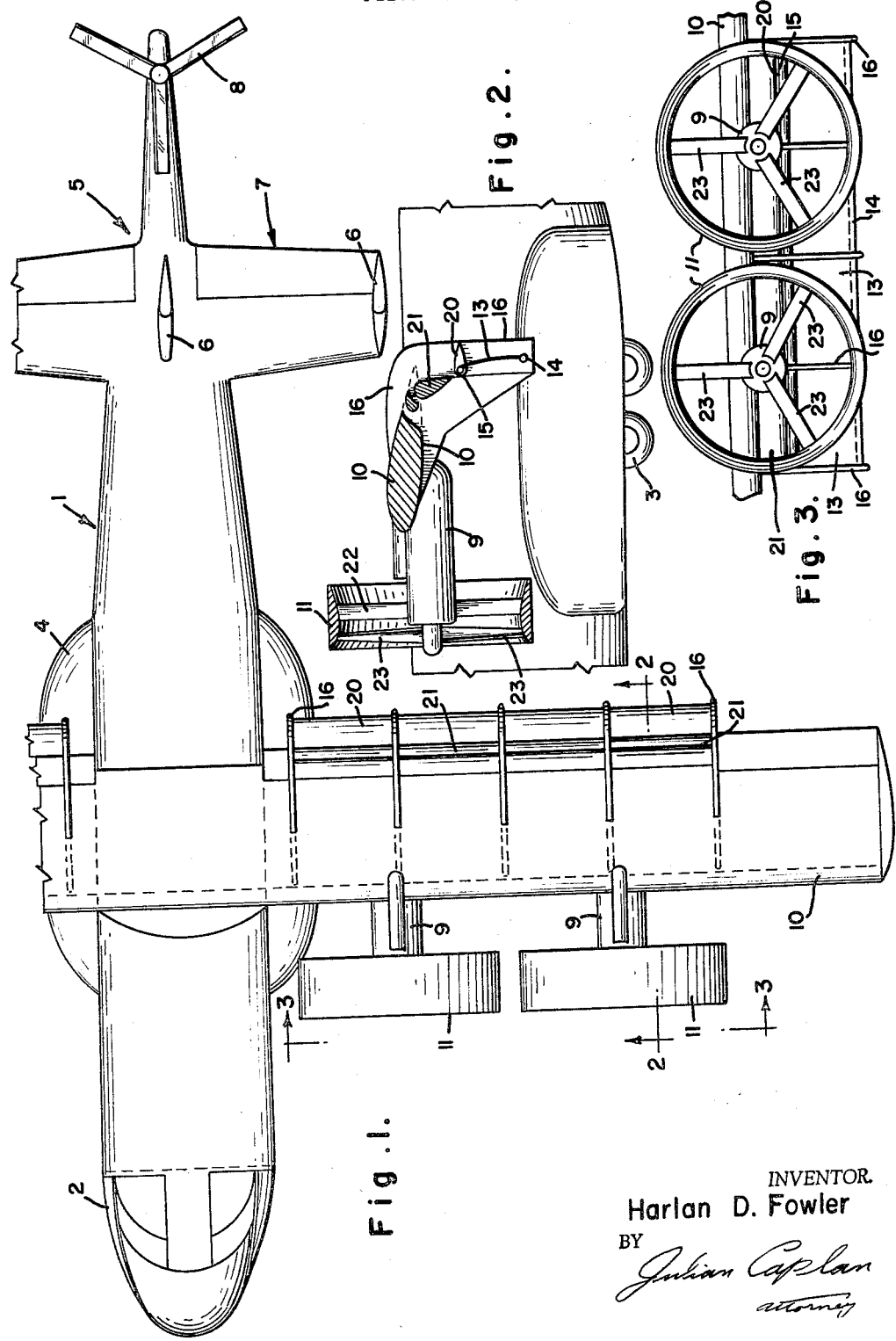
June 11, 1963 — H. D. FOWLER — 3,093,347
CONVERTIBLE VTOL AIRCRAFT
Filed Dec. 26, 1961
INVENTOR.
Harlan D. Fowler
BY Julian Caplan
attorney

3,093,347
CONVERTIBLE VTOL AIRCRAFT
Harlan D. Fowler, Burlingame, Calif.
Filed Dec. 26, 1961, Ser. No. 161,892
9 Claims. (Cl. 244—12)

This invention is directed to aircraft of the type referred to as convertible "VTOL" airplanes, or those capable of vertical take-off and landing and convertible to conventional flight. Reference is made to my application Serial No. 850,439 filed November 2, 1959, now abandoned, of which this application is a continuation in part.

More particularly, this invention is directed to a VTOL convertible airplane utilizing a novel propeller configuration by which a smaller diameter propeller than that previously usable may be employed with VTOL aircraft, while maintaining substantially the same static thrust as that of the larger, previously used propellers, at reduced power.

A major feature of the invention is that my novel propelling device not only contributes to a low propeller weight factor, but is operated by conventional engines at their rated r.p.m., thus eliminating previously necessary special reduction gearing ratios.

One airframe having means for controlling the direction of propeller slipstream thrust which may advantageously be used with this invention may be found in my Patent 2,950,878 on Slip Stream Deflector for Convertible Aircraft and Patent 2,974,899 for Single Propeller Convertible VTOL Aircraft. Both said patents were co-pending with my application S.N. 850,439. Since the structure of the components are known, as well as their operation, further explanation will therefore not be detailed herein.

Therefore, an object and advantage of my invention is to provide an improved VTOL propelling mechanism which simplifies VTOL aircraft design and improves performance of conventional aircraft components during VTOL flight and conventional flight.

It is a further object of this invention to provide a novel VTOL propelling configuration which uses a small, lightweight propeller.

It is another object of my invention to provide propelling means for VTOL aircraft which uses a lighter, smaller and less complicated propelling system than that previously used, with reduced power requirements, while developing substantially the same static thrust.

A further advantage of the present invention is the fact that the noise level is reduced by about one-half.

Still another advantage of the present invention is the fact that the shroud exit clearly defines the boundary of the slipstream over the wing, thereby more effectively directing the slipstream as compared with convention (unshrouded) propeller slipstreams.

It is still another object to provide a novel propelling mechanism for VTOL aircraft which utilizes the rated r.p.m. of standard engines without special reduction gearing ratios.

Other objects and advantages will be obvious from a study of the elements, apparatus combination, and method of operation set forth hereafter with reference to the appended drawings in which:

FIG. 1 is a top plan view of a convertible VTOL aircraft with propelling mechanism according to my invention;

FIG. 2 is a detailed vertical sectional view of a portion of the aircraft taken substantially along the line of 2—2 of FIG. 1; and FIG. 3 is a front elevational view of the propelling mechanism of FIG. 1 along section 3—3.

An aircraft utilizing this invention is generally a high-wing airplane so as to reduce ground effect from the downwardly directed slipstream. Such airplanes may be single or multi-engined propeller craft. Normally, the engines are mounted on the wing with the slipstream directed over and rearwardly of the wing, although it is to be understood that it is anticipated that the novel concepts of this invention may be used on, and with, other types of aircraft.

THE DRAWINGS

In the aircraft illustrated in the drawings, there is shown a fuselage generally indicated by reference numeral 1 which includes a pilot's compartment 2, landing gear 3 suitably positioned in outboard housings 4; and an empennage assembly 5. The empennage includes a vertical stabilizer and rudder 6 and a horizontal stabilizer and an elevator 7. An outrigger control propeller 8, provided for pitch and yaw control during VTOL flight, is mounted aft of the empennage on an extension of the fuselage.

Two engines 9 are mounted on each side a high wing 10; only two on one side are illustrated. The inboard engine is obviously spaced from the fuselage a sufficient distance to allow for a shroud 11. Each engine also has a propeller 23 mounted thereon. A feature of the present invention is the fact that, as is shown in the drawings, the fuselage 1 and wing 10 are of conventional configuration and design, and since the propeller 23 and engines 9 are likewise standard hence the design of the craft is in many important particulars conventional.

Aft of each engine 9, and generally along the trailing edge of the wing is mounted a flexible curtain 13, supported by rod 14 and roller 15 as detailed in my patents mentioned above. The curtains are mounted in essentially streamline end plates 16 extending rearwardly and downwardly of the wing 10. Each flexible curtain is arranged to be rolled up on roller 15 enclosed in a horizontal strut 20 secured between the end plates 16. The detail of this slipstream deflector is described in Patent 2,950,878. A slotted flap 21 is arranged to move rearwardly from its streamline position in the wing to a position between the horizontal strut 20 and the trailing edge of the wing 10 (shown in FIG. 2) to aid the deflection of the slipstream. The term "slotted flap" is used herein to include such devices as the "Fowler flap," a construction well understood by those skilled in this art. The flap 21 shown in FIG. 2 is another example of a slotted flap. Such a slotted flap is also described in Patent 2,950,878, column 3, lines 47–55. The term "slotted flap" thus means a flap which opens a slot or gap as it extends rearwardly, which permits air to flow through the rear of the flap and thereby delay the stall to a much higher flap deflection than would otherwise be the case in deflected slipstream aircraft. Flap 21 also permits a small amount of the slipstream to pass therethrough to the empennage for additional control of the aircraft during VTOL movements.

The engines 9 support the shrouds 11 by means of fixed stator struts 22 positioned to permit propeller blades 23 to operate with reasonable clearance between the propeller tips and the inner surface of the shroud. In FIG. 2, a cross-section of the shroud 11 is shown to be generally a teardrop or of an airfoil configuration with a chord not exceeding one-half the propeller diameter which directs the slipstream from the propeller blades rearwardly. Further, the point of connection between the stator struts on the interior annular surface of the shroud is rearward of the smallest diameter which position prevents undue swirling of the slipstream and also provides adequate support of the shroud to the engine nacelle.

The propeller blades 23 may be adjustable in pitch if desired, although in VTOL maneuvers, in the preferred mode of operation, they are normally in a fixed position.

THEORY OF OPERATION

The shrouded propeller provides an important design change in that it not only permits using a smaller diameter propeller, but will develop substantially the same static thrust of a given engine at reduced power. The smaller propeller, also, permits operation directly in the rated r.p.m. of the engine, rather than using reduction gears.

A dependable formula by which to calculate static thrust of the propeller is as follows:

$$T = 13.13 \ (F.M. \times D \times B.H.P. \ \sigma^{\frac{1}{2}} \ (Ae/Ad^{\frac{1}{2}})^{2/3} \quad (1)$$

where:

F.M.="figure of merit"=0.92
$Ae$=area of the shroud exit
$Ad$=area at the propeller
$\sigma$=density ratio However, for conservative purposes, $Ae/Ad$ is taken to be 1.0 and $$T = 13.13 \ (0.92 \times D \times B.H.P. \ \sigma^{\frac{1}{2}} \times 1.0)^{2/3} \quad (2)$$

After a number of trials it was found the required power to develop a static thrust of 4100 lbs. was 85% normal power (705 H.P.) of the Lycoming T-53 L-3, with an 8.5-foot diameter propeller, thus $$T = 13.13 \ (0.92 \times 8.5 \times 705 \times 1.00)^{2/3} \quad (3)$$
$$= 13.13 \ (5450)^{2/3} = 13.13 \times 312 = 4100 \ \text{lbs.}$$

Thus, the power required was 705/915=0.775 of that used on the former L-19 VTOL design using a 12.0 foot diameter propeller at 1550 r.p.m. This is an important change as it provides an excess of power for use at high altitude for hovering and VTOL operation. In other words, VTOL operation is at derated power at sea-level similar to the operation of helicopters.

As pointed out above, an important feature is the small diameter of the propeller which not only contributes a low weight factor but permits operating at the rated r.p.m. of the engine. In the former L-19 VTOL with its large 12.0 diameter propeller, it was necessary to reduce the engine r.p.m. from its military rating of 1700 to 1550 by special reduction gearing. It is not necessary to use reduction gearing with the shrouded propeller of the invention, because of its smaller diameter.

As has been customary with conventional propellers, the dynamic pressure which occurs at 0.5 D behind the propeller, as developed from the static thrust $$q' = \frac{\text{thrust}}{\pi/4 D^2} = \frac{.4150}{.785 \times 12^2} = 36.6 \ \text{lbs./sq. ft.} \quad (4)$$

With the shrouded propeller the approach to solving for $q'$ is different.

The velocity $V_2$ immediately behind the propeller is given as $$V_2 = V_4 \left(\frac{Ae}{Ad}\right) \quad (5)$$

where $V_4$ is at a station far behind the propeller.

$$V_4 = \left(\frac{Pa}{qAe}\right)^{1/3} \quad (6)$$

Where $Pa$ is the actual power
$$705 \times 550 \times 0.92 = 370,000$$
and
$$Ae = 9.5^2 \times .785 = 71.0 \ \text{sq. ft.}$$
$$Ad = 8.5^2 \times .785 = 56.7 \ \text{sq. ft.}$$

$$V_4 \sqrt[3]{\frac{2 \times 370000}{.00238 \times 71}} = 164 \ \text{ft./sec;} \quad (7)$$

and
$$V_2 = 164 \times 71.0/56.7 = 206 \ \text{ft./sec.} \quad (8)$$

The location of $V_4$ is established as the distance from the rear of the shroud to a distance of 9.5 feet or 144 inches from the propeller.

This distance from the leading edge of the monoplane wing to the propeller is 60 inches, and is the point for determining $V_s$ of the slipstream.

$$V_s = 206 - (206 - 164 \times 60/144) = 206 - 17.5 = 188.5$$
$$\text{ft./sec.}$$

and $$q' = 188.5^2 \times .00119 = 42.2 \ \text{lbs./sq. ft.} \quad (9)$$

as compared to 36.6 lbs./sq. ft. for the L-19 VTOL with a 12 foot propeller.

The slipstream boundary diverges over the wing instead of contracting as with conventional propeller. This divergency forces the slipstream to spill over the wing and around the end plates toward the rear, and eventually to the tail surfaces, thus aiding greatly in control of the aircraft during VTOL operations.

SUMMARY

From extensive research, it was determined that a propeller according to my invention need develop only 40% of the total available static thrust developed by the shroud for normal operation, which indicates a very low propeller weight. Further, the shroud reduces the noise level by about one-half that of an unshrouded propeller. The shroud permits the use of a fixed pitch propeller throughout VTOL movements and in the transition range of operation with no appreciable loss in performance. This feature engenders a low weight and low cost propeller installation.

Due to the fact that there will be no extreme angular changes in the attitude of the aircraft or air-foil components, such as occur in tilt wing, tilt-propeller configuration or tilting of a flying platform using shrouded fans, any disturbing action that may exist during cruise flight with my invention has been determined to be under adequate control of the combined forces of the tail surfaces and other controls.

Another favorable factor of the shroud is that by use of angular placed stators or supporting struts, it is possible to prevent swirling action of the slipstream over the wing, as well as relieve the torque effect, without substantially impairing the efficiency of the shrouded propeller. This action has definite and favorable effect on distribution of the slipstream over the central cellule. The stator struts are secured to the engine nacelle and shroud and designed to take up the forces created by the propeller on the shroud, but are not shown in FIG. 3 to avoid confusion with the propeller blades 23.

During VTOL operation there is essentially no lift or drag from the shroud by virtue of no forward motion. What drag may exist is taken up by the shroud and included in the element of thrust.

Compared to the unshrouded propeller used on the L-19 VTOL design, the power necessary for sea level VTOL movements is reduced from 915 to 705 H.P. and the propeller is reduced from 12.0 to 8.5 feet diameter by means of the shroud. Similar power reduction occurs for multi-engine airplanes.

Further, the severe pitching normally incurred during VTOL operation in a tilt-wing, tilt propeller configuration is substantially obviated and easily controllable with the use of a shroud as used in my invention due to the controlled rearward flow of the slipstream. Multiengine configuration of the aircraft permits further control of yaw by changing power settings on the engines of either side.

PLACING THE SHROUD

With conventional propellers the cross section of the slipstream converges to a diameter above seven-tenths the diameter of the propeller which give substantially one-half of the projected propeller disc area. With the shrouded propeller configuration of this invention, the slipstream diverges and covers more wing area, thus producing a more effective lift. Further, the effective velocity of the slipstream is much higher since it is directed and not swirled and burbled as with unshrouded propellers: In fact, with the propeller of this invention, the slipstream diameter is diverged to about 0.70 the unshrouded propeller diameter, or above one-half the propeller disc area, in square feet.

Having thus described one manner of practicing the novel concepts of this invention, it is to be understood that it is not desired to be specifically limited to the configuration set forth in the appended drawings and described in this specification, but rather by the scope of the claims appended hereinafter.

Although the foregoing invention has been described in some detail, by way of illustration and example for purposes of clarity of understanding it is understood that certain changes and modifications may be practiced within the spirit of the invention and scope of the appended claims.

What is claimed is:

1. In an airplane arranged for vertical takeoff and landing and conventional flight operations, combination of a fuselage, at least one conventional major airfoil, mounted on said fuselage, a propeller rotatably mounted on said airfoil, means for driving said propeller, a stationary shroud circumferentially mounted around but spaced from the tips of said propeller, a slotted flap mounted on said airfoil for retracted movement adjacent said airfoil and projected position below said airfoil, and a slipstream deflector mounted on said airfoil below the projected position of said slotted flap, said deflector having a retracted position and a downwardly disposed projected position, said shroud, flap and deflector cooperating when said flap and deflector are in projected positions to force a slipstream from said propeller generally horizontally over said airfoil and in a substantially downward direction, said fuselage, said airfoil and the axis of said propeller maintaining a substantially horizontal attitude during said operations, the leading edge of said airfoil being located rearwardly of the entire exit of said shroud and of said propeller.

2. The airplane of claim 1, in which the shroud is of annular cross-section configuration.

3. The airplane of claim 2, in which the propeller is of the variable pitch type having journalled relationship with the internal annular surface of the shroud.

4. The combination of claim 1, in which the diameter of the exit of said shroud is greater than the diameter of the effective projected propeller disc.

5. The combination of claim 1, in which said shroud is constructed and arranged to direct the slipstream of said propeller in confined circular flow over said airfoil.

6. In an airplane arranged for vertical takeoff and landing and conventional flight operations, combination of a fuselage, at least one conventional major airfoil, mounted on said fuselage, a propeller, an engine mounted on said airfoil in conventional manner, said propeller being mounted in advance of said engine and driven by said engine, said propeller having a plurality of radial blades, a stationary shroud circumferentially mounted around but spaced from the tips of said propeller, a slotted flap mounted on said airfoil for retracted movement adjacent said airfoil and projected position below said airfoil, and a slipstream deflector mounted on said airfoil below the projected position of said slotted flap, said deflector having a retracted position and a downwardly disposed projected position, said shroud, flap and deflector cooperating when said flap and deflector are in projected positions to force a slipstream from said propeller generally horizontally over said airfoil and in a substantially downward direction, said fuselage, said airfoil and the axis of said propeller maintaining a substantially horizontal attitude during said operations, the leading edge of said airfoil being located rearwardly of the entire exit of said shroud and of said propeller.

7. The airplane of claim 6, in which said shroud is of axially directed airfoil cross-sectional configuration, said propeller blades being operative within the annular surface of said shroud, with radial angularly fixed stator struts supporting said shroud rearwardly of said propeller whereby the swirl and attending torque effect are reduced.

8. The airplane of claim 6, in which the point of positioning of said propeller blades relative to the internal annular surface of said shroud is substantially at the narrowest diameter of the shroud.

9. The airplane of claim 8, in which the propeller blades are of a variable pitch type.

References Cited in the file of this patent

UNITED STATES PATENTS 2,929,580     Ciolkosz _____ Mar. 22, 1960